United States Patent
Aoki et al.

(10) Patent No.: US 9,303,119 B2
(45) Date of Patent: Apr. 5, 2016

(54) CURRENT BREAKER CASE AND CURRENT BREAKER USING THE SAME

(71) Applicant: IDEMITSU KOSAN CO., LTD., Chiyoda-ku (JP)

(72) Inventors: Yusuke Aoki, Ichihara (JP); Noritada Takeuchi, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/368,122

(22) PCT Filed: Feb. 28, 2013

(86) PCT No.: PCT/JP2013/001228
§ 371 (c)(1),
(2) Date: Jun. 23, 2014

(87) PCT Pub. No.: WO2013/128931
PCT Pub. Date: Sep. 6, 2013

(65) Prior Publication Data
US 2015/0001054 A1    Jan. 1, 2015

(30) Foreign Application Priority Data

Feb. 28, 2012   (JP) .................................. 2012-041010

(51) Int. Cl.
| | |
|---|---|
| *B60L 3/04* | (2006.01) |
| *C08G 64/02* | (2006.01) |
| *C08K 5/42* | (2006.01) |
| *C08L 69/00* | (2006.01) |
| *C08G 64/18* | (2006.01) |
| *C08G 77/448* | (2006.01) |
| *H01H 9/02* | (2006.01) |
| *H01H 9/04* | (2006.01) |

(Continued)

(52) U.S. Cl.
CPC ............... *C08G 64/0208* (2013.01); *B60L 3/04* (2013.01); *C08G 64/186* (2013.01); *C08G 77/448* (2013.01); *C08K 5/42* (2013.01); *C08L 69/00* (2013.01); *H01H 9/0271* (2013.01); *H01H 9/042* (2013.01); *H01H 39/00* (2013.01); *C08K 5/51* (2013.01); *C08L 2203/20* (2013.01); *H01H 2231/026* (2013.01)

(58) Field of Classification Search
None
See application file for complete search history.

(56) References Cited

U.S. PATENT DOCUMENTS

| | | | | |
|---|---|---|---|---|
| 5,455,310 | A * | 10/1995 | Hoover et al. | 525/431 |
| 6,194,988 | B1 | 2/2001 | Yamaguchi et al. | |
| 6,252,013 | B1 * | 6/2001 | Banach et al. | 525/464 |

(Continued)

FOREIGN PATENT DOCUMENTS

| | | |
|---|---|---|
| CN | 201060824 Y | 5/2008 |
| CN | 102002224 A | 4/2011 |

(Continued)

OTHER PUBLICATIONS

U.S. Appl. No. 14/426,877, filed Mar. 9, 2015, Aoki.

(Continued)

*Primary Examiner* — Robert S Loewe
(74) *Attorney, Agent, or Firm* — Oblon, McClelland, Maier & Neustadt, L.L.P.

(57) ABSTRACT

A current breaker case including a polycarbonate resin composition that includes a polycarbonate-polyorganosiloxane copolymer and has a viscosity-average molecular weight of 18000 to 25000.

18 Claims, 1 Drawing Sheet

(51) Int. Cl.
*H01H 39/00* (2006.01)
*C08K 5/51* (2006.01)

(56) References Cited

U.S. PATENT DOCUMENTS

| | | | |
|---|---|---|---|
| 7,232,865 B2* | 6/2007 | DeRudder et al. | 525/446 |
| 8,158,701 B1* | 4/2012 | Gallucci et al. | 524/128 |
| 8,653,386 B2 | 2/2014 | Ukon et al. | |
| 2003/0065092 A1* | 4/2003 | Takagi | 525/67 |
| 2004/0028855 A1* | 2/2004 | Masuki et al. | 428/35.7 |
| 2005/0085580 A1* | 4/2005 | Marugan et al. | 524/431 |
| 2005/0101757 A1* | 5/2005 | Glasgow et al. | 528/196 |
| 2006/0159926 A1* | 7/2006 | Funaki et al. | 428/412 |
| 2008/0021146 A1* | 1/2008 | Komatsu et al. | 524/437 |
| 2008/0108754 A1 | 5/2008 | Hayata et al. | |
| 2008/0212213 A1* | 9/2008 | Kogure et al. | 359/838 |
| 2009/0069478 A1* | 3/2009 | Seki et al. | 524/405 |
| 2010/0184884 A1* | 7/2010 | Miyake et al. | 523/452 |
| 2010/0227963 A1* | 9/2010 | Hironaka et al. | 524/451 |
| 2011/0207846 A1* | 8/2011 | Monden | 523/134 |
| 2012/0301766 A1* | 11/2012 | Monden et al. | 429/100 |
| 2013/0035429 A1* | 2/2013 | Tajima | 524/165 |
| 2013/0082222 A1 | 4/2013 | Aoki | |
| 2013/0303672 A1* | 11/2013 | Aoki | 524/166 |
| 2015/0005423 A1* | 1/2015 | van de Wetering et al. | 524/156 |

FOREIGN PATENT DOCUMENTS

| | | |
|---|---|---|
| EP | 2 896 655 A1 | 7/2015 |
| JP | 2000-21278 | 1/2000 |
| JP | 2010-86653 | 4/2010 |
| JP | 2011-21127 | 2/2011 |
| TW | 201114579 A1 | 5/2011 |
| TW | 201127882 A1 | 8/2011 |
| WO | WO 2011/155490 A1 | 12/2011 |

OTHER PUBLICATIONS

International Search Report issued May 7, 2013, in PCT/JP13/001228 filed Feb. 28, 2013.
Combined Office Action and Search Report issued Jul. 31, 2015 in Chinese Patent Application No. 201380009727.X (with English Translation of Category of Cited Documents).
Extended European Search Report issued on Sep. 7, 2015 in Patent Application No. 13754704.8.

* cited by examiner

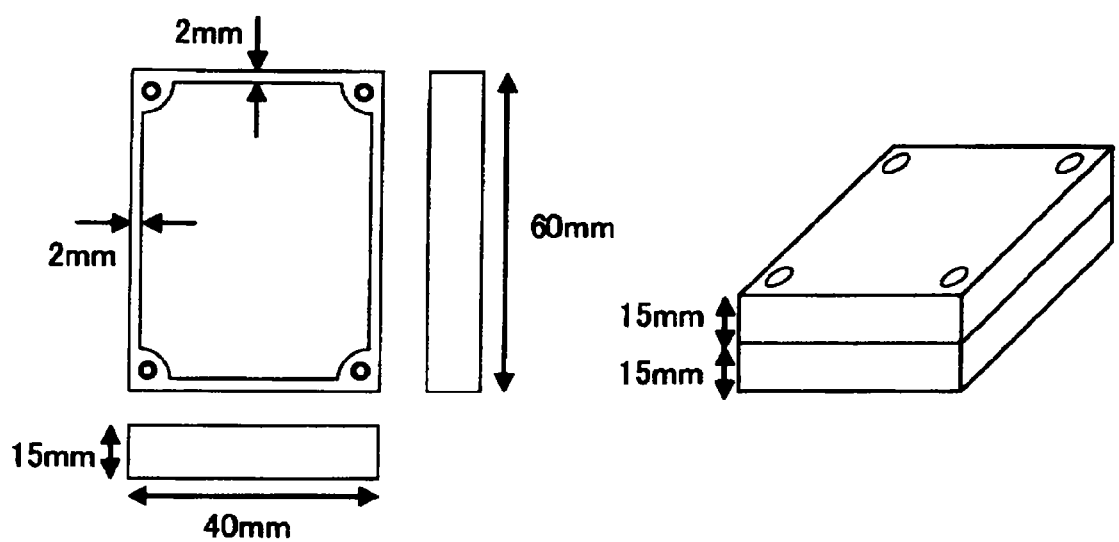

CURRENT BREAKER CASE AND CURRENT BREAKER USING THE SAME

TECHNICAL FIELD

The invention relates to a current breaker case and a current breaker using the same.

BACKGROUND ART

In recent years, next-generation automobiles such as an electric car (EV), a hybrid car (HV) and a plug-in hybrid car (PHV), for which reduction in carbon dioxide and less dependency on petroleum are expected, have been actively developed. Large current is frequently flown in these automobiles, and in order to prevent occurrence of secondary damages such as fire, electric leakage and electric shock, an apparatus for breaking current has come to be required. As such an apparatus, a gas-pressure circuit breaker is known in which gun powder or the like is caused to explode or ignite, and pressure generated is used to break an electronic circuit (Patent Document 1, for example).

An inflator-using gas-pressure circuit breaker installed in automobiles has to meet requirements of the ISO12097 test or tests peculiar to automobile manufacturers in accordance with ISO12097. For example, ISO12097-3 requires an impact test at $-35°$ C., $23°$ C. and $85°$ C. Further, as stipulated in JISD204 (JIS standards for automobile parts), when an extremely cold area is taken into consideration, a low-temperature test at $-30°$ C. or $-40°$ C. is required. In order to satisfy such requirements, in a gas-pressure type circuit breaker case for automobiles, metals or ceramics are used. However, in order to reduce the weight of an automobile to attain fuel saving, it is required to replace a metal and ceramics constituting elements by a resin (i.e., fabrication of resin parts). In fabricating resin parts, common engineering plastics having a resistance to heat of $100°$ C. or higher can withstand the test requirements at $85°$ C. At the same time, it is required to satisfy test requirements at low temperatures of $-35$ to $-40°$ C. In addition, a high degree of flame retardancy may be required just in case of ignition.

RELATED ART DOCUMENTS

Patent Documents

Patent Document 1: JP-A-2010-86653

The invention has been made in view of the above-mentioned subject, and is aimed at providing a resin-made current breaker case and a current breaker using the same.

According to the invention, the following current breaker case and current breaker are provided.
1. A current breaker case comprising a polycarbonate resin composition that comprises a polycarbonate-polyorganosiloxane copolymer and has a viscosity-average molecular weight of 18000 to 25000.
2. The current breaker case according to 1, wherein the polycarbonate resin composition comprises a polycarbonate-based resin (A) comprising:
    5 to 100 mass % of a polycarbonate-polyorganosiloxane copolymer (A-1) that comprises, in its main chain, a polycarbonate block composed of structural units represented by the formula (I) and a polyorganosiloxane block composed of structural units represented by formula (II); the content of the polyorganosiloxane block being 2 to 20 mass %; and
    0 to 95 mass % of an aromatic polycarbonate (A-2) that is other than the (A-1):

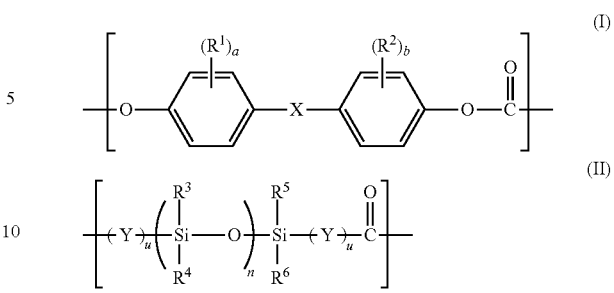

wherein $R^1$ and $R^2$ are independently an alkyl group including 1 to 6 carbon atoms or an alkoxy group including 1 to 6 carbon atoms;
X is a single bond, an alkylene group including 1 to 8 carbon atoms, an alkylidene group including 2 to 8 carbon atoms, a cycloalkylene group including 5 to 15 carbon atoms, a cycloalkylidene group including 5 to 15 carbon atoms, —S—, —SO—, —$SO_2$—, —O— or —CO—;
a and b are an integer of 0 to 4;
$R^3$ to $R^6$ are independently a hydrogen atom, a halogen atom or an alkyl group including 1 to 6 carbon atoms, an alkoxy group including 1 to 6 carbon atoms or an aryl group including 6 to 12 carbon atoms;
Y is a divalent organic group including one or more selected from an aliphatic chain and an aromatic ring;
u is 0 or 1; and
n is an average repeating number of the siloxane group and is an integer of 20 to 600.
3. The current breaker case according to 2, wherein Y is a divalent organic group derived from allylphenol or eugenol.
4. The current breaker case according to 2 or 3, wherein the structural unit represented by the formula (I) is a structural unit derived from bisphenol A.
5. The current breaker case according to any of 2 to 4, wherein both $R^3$ and $R^4$ in the structural unit represented by the formula (II) are methyl groups.
6. The current breaker case according to any of 2 to 5 which further comprises one or more selected from the following component (B), component (C) and component (D) relative to 100 parts by mass of the polycarbonate-based resin (A):
    (B) 0.01 to 1 part by mass of a phosphorous-based antioxidant;
    (C) 0.01 to 0.15 part by mass of one or more selected from an alkali metal salt of an organic sulfonic acid and an alkaline earth metal salt of an organic sulfonic acid; and
    (D) 0.1 to 1 part by mass of powder mixture comprising polytetrafluoroethylene particles and organic polymer particles.
7. A current breaker comprising the current breaker case according to any of 1 to 6 and an electronic circuit.

According to the invention, a resin-made current breaker case that has excellent impact resistance from low to high temperatures and a current breaker using the same can be provided.

BRIEF DESCRIPTION OF THE DRAWINGS

FIG. 1 is a view showing the structure of a molded product of a model of a current breaker (case) for automobiles used for evaluating molding properties and impact resistance in the Examples.

MODE FOR CARRYING OUT THE INVENTION

In order to allow impact resistance properties to be developed, it is effective to allow the viscosity-average molecular weight of a polycarbonate resin composition comprising a polycarbonate-polyorganosiloxane copolymer to be large. However, due to an increase in viscosity, not only productivity at the time of production may be lowered, but also molding may become difficult.

It is possible to decrease the viscosity of a resin composition by increasing the molding temperature. In this case, the molding cycle is prolonged to cause inefficient economy, and if the temperature is excessively increased, the production stability is lowered due to thermal degradation of the resin composition.

The inventors have found that, by allowing the viscosity-average molecular weight (Mv) of a polycarbonate resin composition comprising a polycarbonate-polyorganosiloxane copolymer forming the current breaker case to be in the range of 18000 to 25000, both impact resistance and production stability or the like can be improved. If the viscosity-average molecular weight is less than 18000, the strength of a molded product may be insufficient. If the viscosity-average molecular weight exceeds 25000, since the viscosity of the copolymer is increased, not only productivity and safety at the time of production may be lowered, but also molding may become difficult. The viscosity-average molecular weight (Mv) of the polycarbonate resin composition is preferably within a range of 18300 to 24700, more preferably, within a range of 18600 to 24400.

Here, the viscosity-average molecular weight (Mv) means a value obtained by measuring the limiting viscosity [η] of methylene chloride at 20° C. and then calculating in accordance with the Schnell's formula ([η]=$1.23 \times 10^{-5} \times Mv^{0.83}$).

Hereinbelow, an explanation will be made on a polycarbonate resin composition that can be used for producing the current breaker case of the invention.

[Polycarbonate Resin Composition]

It is preferred that the polycarbonate resin composition used in the invention comprise a polycarbonate-based resin (A) that comprises a polycarbonate-polyorganosiloxane copolymer (A-1) that comprises, in its main chain, a polycarbonate block composed of a structural unit represented by the following formula (I) and a polyorganosiloxane block composed of a structural unit represented by the following formula (II) [hereinbelow, often abbreviated as a PC-PDMS copolymer (A-1) or a component (A-1)] and an aromatic polycarbonate (A-2) that is other than the component (A-1). The polycarbonate-based resin (A) comprises the component (A-1) and the component (A-2). Preferably, the polycarbonate-based resin (A) comprises the component (A-1) and the component (A-2).

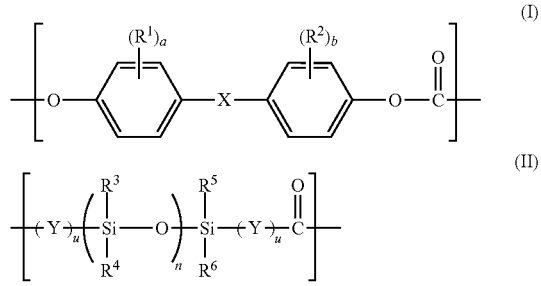

In the formula (I), $R^1$ and $R^2$ are independently an alkyl group including 1 to 6 carbon atoms or an alkoxy group including 1 to 6 carbon atoms.

X is a single bond, an alkylene group including 1 to 8 carbon atoms, an alkylidene group including 2 to 8 carbon atoms, a cycloalkylene group including 5 to 15 carbon atoms, a cycloalkylidene group including 5 to 15 carbon atoms, —S—, —SO—, —SO$_2$—, —O— or —CO—.

a and b are independently an integer of 0, 1, 2, 3 or 4.

In the formula (II), $R^3$ to $R^6$ are independently a hydrogen atom, a halogen atom or an alkyl group including 1 to 6 carbon atoms, an alkoxy group including 1 to 6 carbon atoms or an aryl group including 6 to 12 carbon atoms.

Y is a divalent organic group including one or more selected from an aliphatic chain (preferably, an alkylene group including 1 to 6 carbon atoms) and an aromatic ring (preferably, a benzene ring).

u is 0 or 1.

n is an average repeating number of the siloxane group and is an integer of 20 to 600.

The polycarbonate resin composition used in the invention may contain various arbitrary added components according to need, in addition to the polycarbonate-based resin (A) comprising the component (A-1) and the component (A-2) mentioned above. As specific examples, a phosphorous-based antioxidant (B), one or more (C) selected from an alkali metal salt of an organic sulfonic acid and an alkaline earth metal salt of an organic sulfonic acid, polytetrafluoroethylene particles and organic polymer particles (different from the polymers (A-1) and (A-2) mentioned above) can be given. Details of the arbitrary added components will be mentioned later.

Hereinbelow, a detailed explanation will be made on each component of the polycarbonate resin composition used in the invention.

[PC-PDMS Copolymer (A-1)]

The PC-PDMS copolymer (A-1) used in the invention comprises the structural unit represented by the above formula (I) and the structural unit represented by the above formula (II). The content of the polyorganosiloxane block composed of the structural unit represented by the above formula (II) is normally 2 to 20 mass %, preferably 2.5 to 15 mass %, and further preferably 3 to 10 mass % in the PC-PDMS copolymer (A-1). If the content of the polyorganosiloxane block is less than 2 mass %, the impact strength may be insufficient. A content of the polyorganosiloxane block exceeding 20 mass % may result in significant lowering in heat resistance.

The chain length (the average repeating number n of the siloxane group) of the polyorganosiloxane block represented by the above formula (II) is 20 to 600, preferably 30 to 300 and further preferably 50 to 300. If the chain length is less than 20, the impact strength may be insufficient, and if the chain length exceeds 600, handling at the time of producing the PC-PDMS copolymer (A-1) may be difficult, resulting in poor economy.

In respect of well-balanced strength and productivity of a molded product, the viscosity-average molecular weight (Mv) of the PC-PDMS copolymer (A-1) is preferably 12,000 to 50,000, more preferably 14,000 to 30,000, and further preferably 16,000 to 25,000.

The PC-PDMS copolymer (A-1) can be obtained by subjecting a divalent phenol represented by the following formula (1), polyorganosiloxane represented by the following formula (2), phosgene, a carbonic acid ester or chloroformate to copolymerization.

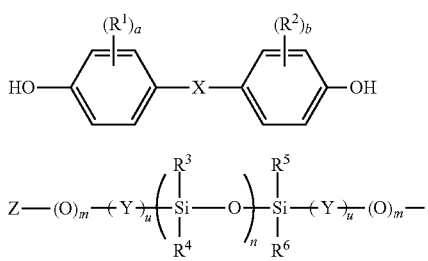

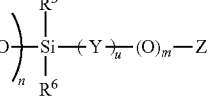

In the formula (1), $R^1$ and $R^2$, X, a and b are the same as those in the above formula (I).

In the formula (2), $R^3$ to $R^6$, Y, u, and n are the same as those in the above formula (II).

m is 0 or 1.

Z is a halogen, $-R^7OH$, $-R^7COOH$, $-R^7N(R^8)_2$, $-COOH$ or $-SH$.

$R^7$ is a linear, branched or cyclic alkylene group, an aryl-substituted alkylene group, an aryl-substituted alkylene group that may have an alkoxy group on the ring or an arylene group.

$R^8$ are independently a hydrogen atom, an alkyl group, an alkenyl group, an aryl group or an aralkyl group.

Although no specific restrictions are imposed on the divalent phenol represented by the formula (1) used as the raw material of the PC-PDSM copolymer (A-1), 2,2-bis(4-hydroxyphenyl)propane (common name: bisphenol A) is preferable. When bisphenol A is used as the divalent phenol, the PC-PDSM copolymer (A-1) becomes a PDSM copolymer in which, in the formula (I), X is an isopropylidene group and a=b=0.

As the divalent phenol other than bisphenol A, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-dichlorophenyl)propane and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane and 1,1-bis(4-hydroxyphenyl)cyclododecane; dihydroxyaryl ethers such as 4,4'-dihydroxy-phenyl ether and 4,4'-dihydroxy-3,3'-dimethyl ether; dihydroxydiarylsulfides such as 4,4'-dihydroxydiphenyl sulfide and 4,4'-dihydroxy-3,3'-dimethyldiphenyl sulfide; dihydroxydiarylsulfoxides such as 4,4'-dihydroxydiphenylsulfoxide and 4,4'-dihydroxy-3,3'-dimethyldiphenylsulfoxide; dihydroxydiarylsulfones such as 4,4'-dihydroxydiphenylsulfone and 4,4'-dihydroxy-3,3'-dimethylphenylsulfone; dihydroxyphenyls such as 4,4'-dihydroxyphenyl; dihydroxydiarylfluorenes such as 9,9-bis(4-hydroxyphenyl)fluorene, 9,9-bis(4-hydroxy-3-methylphenyl)fluorene; dihydroxydiaryladamantanes such as bis(4-hydroxyphenyl)diphenylmethane, 1,3-bis(4-hydroxyphenyl)adamantane, 2,2-bis(4-hydroxyphenyl)adamantane and 1,3-bis(4-hydroxyphenyl)-5,7-dimethyladamantane; 4,4'-[1,3-phenylenebis(1-methylethylidene)]bisphenol, 10,10-bis(4-hydroxyphenyl)-9-anthrone, 1,5-bis(4-hydroxyphenylthio)-2,3-dioxapentane or the like can be given.

These divalent phenols may be used singly or in a mixture of two or more.

The polyorganosiloxane represented by the formula (2) can be produced easily by allowing phenols substituted by a group having an olefinic unsaturated carbon-carbon bond (preferably, vinylphenol, allylphenol, eugenol, and isopropenylphenyl) to be hydrosilanated to the terminal to an organosiloxane chain having a predetermined polymerization degree (the average repeating number n of the siloxane group). The above-mentioned phenols are more preferably allylphenol or eugenol. In this case, Y in the formula (II) of the component (A-1) is a divalent organic group derived from allylphenol or eugenol.

As the polyorganosiloxane represented by the formula (2), one in which both $R^3$ and $R^4$ are methyl groups is preferable. It is further preferred that both $R^5$ and $R^6$ be methyl groups.

As preferable examples of the polyorganosiloxane represented by the formula (2), compounds represented by the following formulas (3) to (11) can be given, for example.

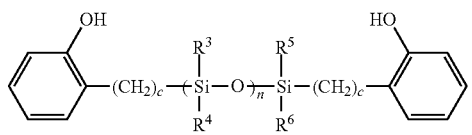

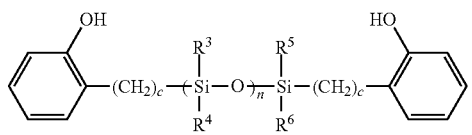

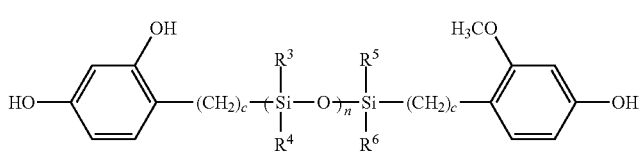

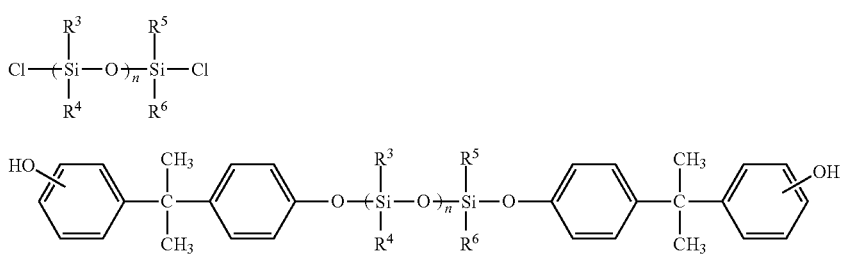

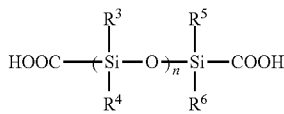

(8)

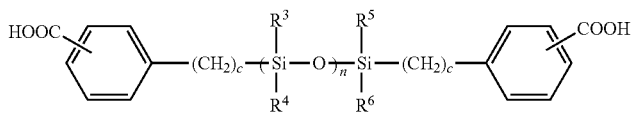

(9)

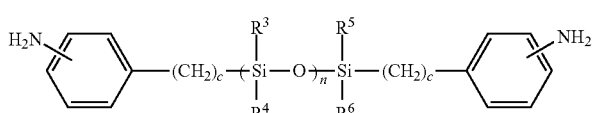

(10)

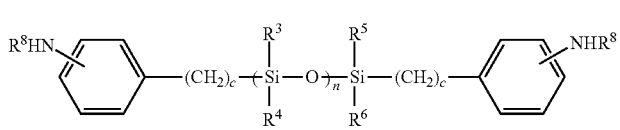

(11)

In the above formulas (3) to (11), $R^3$ to $R^6$ are the same as in formula (II).

c is a positive integer (normally, an integer of 2 to 6).

$R^8$ is the same as in the formula (2).

Among these, in respect of easiness in polymerization, a phenol-modified polyorganosiloxane represented by the formula (3) is preferable. In respect of easiness in availability, α,ω-bis[3-(o-hydroxyphenyl)propyl]polydimethylsiloxane that is one of compounds represented by the formula (4) and α,ω-bis[3-(4-hydroxy-2-methoxyphenyl)propyl]polydimethylsiloxane that is one of the compounds represented by the formula (5) are preferable.

The above-mentioned phenol-modified polyorganosiloxane can be produced by a known method. As the production method, the following methods can be given, for example.

First, cyclotrisiloxane and disiloxane are allowed to react in the presence of an acidic catalyst, thereby to synthesize α,ω-dihydrogen organopolysiloxane. At this time, by changing the charged amount ratio of cyclotrisiloxane and disiloxane, α,ω-dihydrogen organopolysiloxane having a desired average repeating unit can be synthesized. Subsequently, in the presence of a catalyst for hydrosilation, by subjecting this α,ω-dihydrogen organopolysiloxane to addition reaction with a phenol compound having an unsaturated aliphatic hydrocarbon group such as allylphenol and eugenol, a phenol-modified polyorganosiloxane having a desired average repeating unit can be produced.

Further, at this stage, since low-molecular-weight cyclic polyorganosiloxane or an excessive amount of the above-mentioned phenol compound remain as impurities, it is preferable to heat under reduced pressure, thereby to remove these low-molecular-weight compounds by distillation.

[Aromatic Polycarbonate (A-2) Other than Component (A-1)]

In the polycarbonate resin composition used in the invention, as the aromatic polycarbonate (A-2) other than the component (A-1) [hereinafter often abbreviated as component (A-2)], use can be made of one that is obtainable by a conventional method for producing aromatic polycarbonate; specifically an interfacial method in which, in the presence of an organic solvent that is inactive for a reaction and an aqueous alkaline solution, a divalent phenol-based compound and phosgene are reacted, and thereafter, a polymerization catalyst such as a tertiary amine and a quaternary ammonium salt is added to allow them to polymerize or a pyridine method in which a divalent phenol-based compound is dissolved in pyridine or a mixture solution of pyridine and an inactive solvent, and phosgene is introduced, whereby an aromatic polycarbonate is directly produced.

As the divalent phenol-based compound used in the production of the aromatic polycarbonate (A-2), bis[hydoxyaryl] alkanes such as 2,2-bis(4-hydroxyphenyl)propane (common name: bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane and 1,1-bis(4-hydroxyphenyl)cyclododecane; dihydroxyarylethers such as 4,4'-dihydroxyphenylether and 4,4'-dihydroxy-3,3'-dimethylphenylether; dihydroxydiarylsulfides such as 4,4'-dihydroxydiphenylsulfide and 4,4'-dihydroxy-3,3'-dimethyldiphenylsulfide; dihydroxydiarylsulfoxides such as 4,4'-dihydroxydiphenylsulfoxide, 4,4'-dihydroxy-3,3'-dimethyldiphenylsulfoxide; dihydroxyarylsulfones such as 4,4'-dihydroxydiphenylsulfone, 4,4'-dihydroxy-3,3'-dimethyldiphenylsulfone, dihydroxydiphenyls such as 4,4'-dihydroxydiphenyl, dihydroxydiarylfluorenes such as 9,9-bis(4-hydroxyphenyl)fluorene, 9,9-bis(4-hydroxy-3-methylphenyl)fluorene, dihydroxydiaryladamantanes such as bis(4-hydroxyphenyl)diphenylmethane, 1,3-bis(4-hydroxyphenyl)adamantane, 2,2-bis(4-hydroxyphenyl)adamantane, 1,3-bis(4-hydroxyphenyl)-5,7-dimethyladamantane, 4,4'-[1,3-phenylenebis(1-methylethylidene)]bisphenol, 10,10-bis(4-hydroxyphenyl)-9-anthrone, 1,5-bis(4-hydroxyphenylthio)-2,3-dioxapentane or the like can be given. Divalent phenols may be used singly or in a mixture of two or more.

When producing the aromatic polycarbonate (A-2), if necessary, a molecular weight modifier, a chain-end terminator or the like may be used. As for these agents, as long as they are used for polymerization of a polycarbonate resin, various agents can be used.

Regarding specific molecular weight modifiers, as the monovalent phenol, phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkylphenol having a linear or branched alkyl group having an average number of carbon atoms of 12 to 35 at an ortho-, metha- or para-position, 9-(4-hydroxyphenyl)-9-(4-methoxyphenyl)fluorene, 9-(4-hydroxy-3-methylphenyl)-9-(4-methoxy-3-methylphenyl)fluorene, 4-(1-adamantyl)phenol or the like can be given.

Of these monovalent phenols, p-t-butylphenol, p-cumylphenol, p-phenylphenol or the like are preferable. These compounds may be either alone or in a mixture of two or more.

As the chain end terminator, monocarboxylic acid and its derivatives or monovalent phenol can be used. For example, p-tert-butyl-phenol, p-phenylphenol, p-cumylphenol, p-perfluorononylphenol, p-(perfluorononylphenyl)phenol, p-(perfluoroxylphenyl)phenol, p-tert-perfluorobutylphenol, 1-(p-hydroxybenzyl)perfluorodecane, p-[2-(1H,1H-perfluorotridecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanic acid, 1,1,1,3,3,3-tetrafluoro-2-propanol or the like can be given.

Further, it is possible to allow the above-mentioned divalent phenol-based compound to be branched polycarbonate by using a branching agent. The amount of the branching agent is preferably 0.01 to 3 mol %, more preferably 0.1 to 1.0 mol % relative to the above-mentioned divalent phenol-based compound.

As the branching agent, for example, a compound having three or more functional groups such as 1,1,1-tris(4-hydroxyphenyl)ethane, 4,4'-[1-[4-[1-(4-hydroxyphenyl)-1-methylethyl]phenyl]ethylidene]bisphenol, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, fluoroglycine, trimetric acid and isatinbis (o-cresol) can be given.

In the polycarbonate-based resin (A) comprising the component (A-1) and the component (A-2) [hereinafter often referred to as the resin mixture (A)], the content of the component (A-1) is normally in a range of 5 to 100 mass %, preferably 30 to 100 mass %, more preferably 45 to 100 mass %, and further preferably 60 to 100 mass %.

On the other hand, the content of the component (A-2) is normally within a range of 95 to 0 mass %, preferably 70 to 0 mass %, more preferably 55 to 0 mass %, and further preferably 40 to 0 mass %.

If the content of the component (A-1) is less than 5 mass %, that is, if the content of the component (A-2) exceeds 95 mass %, in order to increase the content of the polyorganosiloxane block in the resin mixture (A), thereby to improve the impact strength at low temperatures, it is preferable to increase the content of the polyorganosiloxane block that is the structural unit represented by the formula (II) at the time of production of the component (A-1). However, if the content of the polyorganosiloxane block that is the structural unit represented by the formula (II) is increased at the time of production of the component (A-1), the uniformity of the reaction may be deteriorated during the polymerization process. In addition, since a polymerized product and washing water may not be separated sufficiently during the washing process of a polymerized product, the productivity of the component (A-1) may be significantly deteriorated.

The content of the polyorganosiloxane block that is the structural unit of the formula (II) is normally in a range of 2 to 20 mass %, preferably 2 to 10 mass %, more preferably 2.5 to 8 mass % and further preferably 3 to 6 mass % in the resin mixture (A) composed of the component (A-1) and the component (A-2). If the content is 2 mass % or more, effects of improving the impact strength are significant, and if the content is 20 mass % or less, sufficient heat resistance is exhibited.

[(B) Phosphorous-Based Antioxidant]

It is preferred that the polycarbonate resin composition used in the invention contain, in addition to the polycarbonate-based resin (A) composed of the component (A-1) and the component (A-2), a phosphorous-based antioxidant (B).

No specific restrictions are imposed on the phosphorous-based antioxidant (B) used in the invention. Representative examples thereof include, in addition to tris(nonylphenyl)phosphite and 2-ethylhexyldiphenylphosphite, trialkylphosphites such as trimethylphosphite, triethylphosphite, tributylphosphite, trioctylphosphite, trinonylphosphite, tridecylphosphite, trioctadecylphosphite, distearylpentaerythritol diphosphite, tris(2-chloroethyl)phosphite and tris(2,3-dichloropropyl)phosphite; tricycloalkylphosphite such as tricyclohexylphosphite; triarylphosphites such as triphenylphosphite, tricresylphosphite, tris(ethylphenyl)phosphite, tris(butylphenyl)phosphite, tris(hydroxyphenyl)phosphite and tris(2,4-di-tert-butylphenyl)phosphite; trialkylphosphates such as trimethylphosphate, triethylphosphate, tributylphosphate, trioctylphosphate, tridecylphosphate, trioctadecylphosphate, distearylpentaerythritol diphosphate, tris(2-chloroethyl)phosphate and tris(2,3-dichloropropyl)phosphate; tricycloalkylphosphates such as tricyclohexy-1-phosphate; and triarylphosphates such as triphenylphosphate, tricresylphosphate, tris(nonylphenyl)phosphate and 2-ethylphenyldiphenyl phosphate. Of these, triarylphosphite and triarylphosphate are preferably used.

In the invention, these phosphorous-based antioxidants (B) may be used singly or in combination of two or more. Further, the content of the phosphorous-based antioxidant (B) in the polycarbonate resin composition is normally within a range of 0.01 to 1 part by mass, preferably 0.02 to 0.3 part by mass, and further preferably 0.04 to 0.2 part by mass, relative to 100 parts by mass of the polycarbonate-based resin (A). Due to the presence of the phosphorous-based antioxidant (B) within the above-mentioned range, sufficient anti-oxidation effects can be obtained.

[Alkali Metal (Alkaline Earth Metal) Salt (C) of an Organic Sulfonic Acid]

It is preferred that the polycarbonate resin composition used in the invention contain one or more (C) selected from an alkali metal salt of an organic sulfonic acid and an alkaline metal salt of an organic sulfonic acid (hereinafter often abbreviated as the organic sulfonic acid alkali metal (alkaline earth metal) salt (C) or the component (C)) in order to improve flame retardancy.

As the organic sulfonic acid constituting the component (C), perfluoroalkane sulfonic acid or polystyrene sulfonic acid or the like can be given.

Although various organic sulfonic acid alkali metal (alkaline earth metal) salts (C) can be mentioned, an organic sulfonic acid alkali metal (alkaline earth metal) salt having at least one carbon atom can be given.

As the alkali metal, sodium, potassium, lithium, cesium or the like can be given. As the alkaline earth metal, magnesium, calcium, strontium and barium or the like can be given. Among these, a salt of sodium, a salt of potassium and a salt of cesium are preferable.

As the component (C), an alkali metal and/or an alkaline earth metal salt of perfluoroalkane sulfonic acid or polystyrene sulfonic acid is preferable.

As the alkali metal (alkaline earth metal) of perfluoroalkane sulfonic acid, one represented by the following formula (12) can be given.

$$(C_dF_{2d+1}SO_3)_eM \qquad (12)$$

In the formula (12), d is an integer of 1 to 10; M is an alkali metal such as lithium, sodium, potassium and cesium, or an alkaline earth metal such as magnesium, calcium, strontium and barium; and e is an atomic valence of M.

As these metal salts, those stated in JP-B-S47-40445 correspond, for example.

As specific examples of the perfluoroalkane sulfonic acid represented by the formula (12), perfluoromethane sulfonic acid, perfluoroethane sulfonic acid, perfluoropropane sulfonic acid, perfluorobutane sulfonic acid, perfluoromethylbutane sulfonic acid, perfluorohexane sulfonic acid, perfluoroheptane sulfonic acid and perfluorooctane sulfonic acid or the like can be given. In particular, potassium salts of these can preferably be given.

In addition, alkali metal salts or alkaline earth metal salts of an organic sulfonic acid such as alkylsulfonic acid, benzenesulfonic acid, alkylbenzenesulfonic acid, diphenylsulfonic acid, naphthalenesulfonic acid, 2,5-dichlorobenzenesulfonic acid, 2,4,5-trichlorobenzenesulfonic acid, diphenylsulfone-3-sulfonic acid, diphenylsulfone-3,3'-disulfonic acid, naphthalene trisulfonic acid and a fluorine-substituted body thereof and polystyrenesulfonic acid can be given. Among these, as the organic sulfonic acid, perfluoroalkanesulfonic acid and diphenylsulfonic acid are particularly preferable.

As the alkali (alkaline earth) metal salts of polystyrene sulfonic acid, an alkali metal (alkaline earth metal) salt of a sulfonate-containing aromatic vinyl-based resin represented by the following formula (13) can be given.

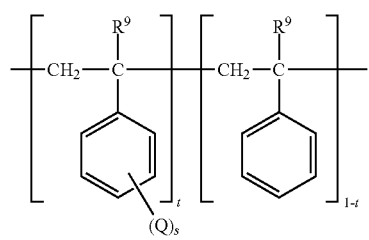

(13)

In the formula (13), Q is a sulfonate and $R^9$ is a hydrogen or a hydrocarbon group including 1 to 10 carbon atoms; s is an integer of 1 to 5; and t is a molar fraction and t satisfies $0 < t \le 1$.

Here, the sulfonate indicated by Q is alkali metal and/or alkaline earth metal salts of a sulfonic acid. As the metal, sodium, potassium, lithium, rubidium, cesium, beryllium, magnesium, calcium, strontium, barium or the like can be given.

In addition, $R^9$ is a hydrogen atom or a hydrocarbon group including 1 to 10 carbon atoms. $R^9$ is preferably a hydrogen atom or a methyl group.

s is an integer of 1 to 5 and t satisfies $0 < t \le 1$. Therefore, as for the sulfonate (Q), those which fully substitute or partially substitute hydrogen atoms of the aromatic ring may be included.

The content of the alkali metal (alkaline earth) metal salt (C) of an organic sulfonic acid is preferably 0.01 to 0.15 part by mass, more preferably 0.02 to 0.13 part by mass, further preferably 0.03 to 0.12 part by mass relative to 100 parts by mass of the resin mixture (A). If the content is 0.01 part by mass or more and 0.15 part by mass or less, flame retardancy can be sufficiently improved.

[(D) Powder Mixture Comprising Polytetraethylene Particles]

It is preferred that the polycarbonate resin composition used in the invention comprise powder mixture (D) that comprises polytetrafluoroethylene particles and organic polymer particles (hereinbelow often abbreviated as the powder mixture (D) or the component (D)).

<Polytetrafluoroethylene Particles>

The polytetrafluoroethylene particles in the powder mixture (D) normally has a particle diameter of 10 μm or less, preferably 0.05 to 1.0 μm.

The polytetrafluoroethylene particles are prepared as an aqueous dispersion in which the particles are dispersed in water containing an emulsifier, for example. The aqueous dispersion containing these polytetrafluoroethylene particles can be obtained by using a fluorine-containing surfactant and by subjecting a tetrafluoroethylene monomer to emulsion polymerization.

When subjecting the polytetrafluoroethylene particles to emulsion polymerization, within a range that does not impair the properties of polytetrafluoroethylene, as the copolymerization components, a fluorine-containing olefin such as hexafluoropropylene, chlorotrifluoroethylene, fluoroalkylethylene and perfluoroalkyl vinyl ether and a fluorine-containing alkyl(meth)acrylate such as perfluoroalkyl(meth) acrylate can be used.

The content of the copolymerization component is preferably 10 mass % or less relative to tetrafluoroethylene in the polytetrafluoroethylene particles.

<Organic Polymer Particles>

Although no specific restrictions are imposed on the organic polymer particles in the powder mixture (D), in respect of dispersion properties of the polytetrafluoroethylene particles to be compounded with the polycarbonate-based resin (A), those having affinity for the polycarbonate resin are preferable.

Specific examples of the monomer for producing organic polymer particles include styrene-based monomers such as styrene, p-methylstyrene, o-methylstyrene, p-chlorostyrene, o-chlorostyrene, p-methoxystyrene, o-methoxystyrene, 2,4-dimethylstyrene and α-methylstyrene; (meth)acrylic acid alkyl ester-based monomers such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, tridecyl acrylate, tridecyl methacrylate, octadecyl acrylate, octadecyl methacrylate, cyclohexyl acrylate and cyclohexyl methacrylate; vinyl cyanide monomers such as acrylonitrile and methacrylonitrile; vinyl ether-based monomers such as vinyl methyl ether and vinyl ethyl ether; vinyl carboxylate-based monomers such as vinyl acetate and vinyl butyrate; olefin-based monomers such as ethylene, propylene and isobutylene; and diene-based monomers such as butadiene, isopyrene and dimethylbutadiene. In particular, (meth)acrylic acid alkyl ester-based monomers are preferably used. The (meth)acrylic alkyl ester-based monomer indicates both acrylic alkyl ester-based monomers and methacrylic alkyl ester-based monomers.

By polymerizing these monomers, organic polymer particles can be obtained. The above-mentioned monomers can be used singly or in a mixture of two or more. As the organic polymer particles, particles comprising a (meth)acrylic alkyl ester-based copolymer are preferable.

The organic polymer particles are prepared in the form of an aqueous dispersion of organic polymer particles, for example. The method for producing organic polymer particles is not particularly restricted, and an emulsion polymerization method in which an ionic emulsifier is used, a soap-free emulsion polymerization method in which an ionic polymerization initiator is used or the like can be given, for example.

As the ionic emulsifier, any of an anionic emulsifier, a cationic emulsifier and an amophoteric ionic emulsifier can be used. Together with these ionic emulsifiers, a nonionic emulsifier can also be used.

As the anionic emulsifier, aliphatic acid salts, higher alcohol sulfuric acid ester salts, liquid fatty oil sulfuric acid ester salts, sulfuric acid salts of an aliphatic amine and an aliphatic amide, aliphatic alcohol phosphoric acid ester salts, sulfonic acid salts of a dibasic aliphatic acid ester, aliphatic acid amide sulfonic acid salts, alkylarylsulfonic acid salts and naphthalene sulfonic acid salts of a formaldehyde condensate or the like can be given.

As the cationic emulsifier, aliphatic amines, quaternary ammonium salts, alkylpyridinium salts or the like can be given.

As the amophoteric emulsifier, alkylbetaine or the like can be given.

As the ionic polymerization initiator, anionic polymerization initiators such as persulfates (for example, potassium persulfate or ammonium persulfate), azobis(isobutyronitrilesulfonate), 4,4'-azobis(4-cyanovaleric acid) and cationic polymerization initiators such as 2,2'-azobis(aminodipropane)dihydrochloride, 2,2'-azobis[2-(5-methyl-2-imidazoline-2-yl)propane]dihydrochloride, 2,2'-azobis[2-(2-imidazoline-2-yl)propane]dihydrochloride, 2,2'-azobisisobutylamide dihydrate can be given.

No specific restrictions are imposed on the particle diameter d of the organic polymer particles in the invention. In respect of a stable aggregate state with polytetraethylene particles, it is preferred that the particle diameter be in a range represented by the following formula relative to the diameter d of the polytetrafluoroethylene particles D.

0.1D<d<10D

<Preparation of Powder Mixture>

The powder mixture (D) formed of polytetrafluoroethylene particles and organic polymer particles can be obtained by mixing an aqueous dispersion of the above-mentioned polytetrafluoroethylene particles and an aqueous dispersion of the organic polymer particles, and then pulverizing by the method mentioned later. This powder mixture contains aggregate particles formed by aggregation due to difference in surface charge of polytetrafluoroethylene particles and organic polymer particles and individual particles that remain without aggregation.

The aggregate particles have a structure in which the polytetrafluoroethylene particles and the organic polymer particles are integrated. The morphology thereof varies depending on the mixing ratio of these particles and the particle size. That is, a morphology in which organic polymer particles surround the polytetrafluoroethylene particle, a morphology in which polytetrafluoroethylene particles surround the organic polymer particle, a morphology in which several particles are aggregated relative to a particle, or the like can be given.

In order to lower the aggregation speed at the time of mixing the above-mentioned aqueous dispersions, it is possible to allow a nonionic emulsifier to be adsorbed to the surface of the polytetrafluoroethylene particles and/or the organic polymer particles before mixing.

No specific restrictions are imposed on the nonionic emulsifier, and polyoxyethylene alkylether, polyoxyethylene alkylaryl ether, dialkylphenoxypoly(ethyleneoxy)ethanol, polyvinyl alcohol, polyacrylic acid and alkyl cellulose or the like can be given.

The aqueous dispersions mixed by the method mentioned above is incorporated into hot water in which metal salts such as calcium chloride and magnesium sulfate or the like are dissolved, for example. The solution is then subjected to salting out and coagulation, followed by drying or pulverization by spray drying.

In the above-mentioned mixed aqueous dispersions, monomers having an ethylenic unsaturated bond are subjected to emulsification polymerization, and the resulting polymer is then pulverized by coagulation or spray drying.

As the ethylenic unsaturated monomers that are subjected to emulsification polymerization in mixed aqueous dispersions, styrene-based monomers such as styrene, p-methylstyrene, o-methylstyrene, p-chlorostyrene, o-chlorostyrene, p-methoxystyrene, o-methoxystyrene, 2,4-dimethylstyrene and a-methylstyrene; (meth) acrylic acid alkyl ester-based monomers such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, cyclohexyl acrylate and cyclohexyl methacrylate; vinyl cyanide-based monomers such as acrylonitrile and methacrylonitrile; vinyl ether-based monomers such as vinyl methyl ether and vinyl ethyl ether; vinyl carboxylate-based monomers such as vinyl acetate and vinyl butyrate; olefin monomers such as ethylene, propylene and isobutylene; and diene-based monomers such as butadiene, isoprene, prene and dimethylbutadiene can be given. These monomers may be used singly or in a mixture of two or more.

The content of the polytetrafluoroethylene in the powder mixture (D) is normally 0.1 to 90 mass %, preferably 30 to 90 mass % and more preferably 40 to 90 mass % in respect of flame retardancy by the anti-dripping effects of the resulting resin composition, the appearance or weld strength or the like of a molded product.

The content of the powder mixture (D) comprising the polytetrafluoroethylene particles and the organic polymer particles in the polycarbonate resin composition used in the invention is normally 0.1 to 1 part by mass, preferably 0.1 to 0.9 part by mass, and more preferably 0.2 to 0.8 part by mass, relative to 100 parts by mass of the polycarbonate resin composition (A). If the content of the powder mixture (D) is 0.1 part by mass or more, the dripping properties are excellent, whereby flame retardancy is improved. On the other hand, if the content of the powder mixture (D) is 1 part by mass or less, the amount ratio of the organic polymer in the composition does not increase excessively, whereby flame retardancy is improved.

In the polycarbonate resin composition used in the invention, in order to improve moldability, impact resistance, appearance and rigidity, in addition to the above-mentioned components (A) to (D), other synthetic resins, elastomers and inorganic fillers may be contained. In particular, in order to improve impact strength at low temperatures, a silicone-based elastomer is preferable.

Further, if necessary, additives commonly used in thermoplastic resins can be incorporated.

As examples of such additives, for example, a phenol-based or sulfur-based antioxidant, an anti-static agent, a polyamide-polyether block copolymer (provided with permanent antistatic properties), an UV absorber such as a benzotriazole-based UV absorber or a benzophenone-based UV absorber, a hindered amine-based photostabilizer (weathering agent), an epoxy compound (a stabilizer as an acid catcher), a mold release agent, a plasticizer, an antibacterial, a compatibilizer, a colorant (dye, pigment) or the like can be given.

The amount of these additives is not particularly restricted as long as the properties of the polycarbonate resin composition used in the invention are maintained so that the properties required of the current breaker case of the invention can be attained.

As for each of the above-mentioned components constituting the polycarbonate resin composition used in the invention and the raw materials thereof, commercially-available products can also be used.

The above-mentioned components (A) to (D) may constitute 90 wt % or more, 95 wt % or more, 98 wt % or more or 100 wt % of the polycarbonate resin composition of the invention.

The polycarbonate resin composition used in the invention can be produced as follows.

The above-mentioned components (A-1) and (A-2), and further, the above-mentioned components (B) to (D) and other arbitrary added components, if necessary, are mixed and stirred, and the resulting mixture is granulated by means of a twin extruder to obtain resin pellets.

The current breaker case of the invention can be produced by subjecting the resin pellets produced by subjecting the above-mentioned method to injection molding or the like.

EXAMPLES

The invention will be explained in more detail with reference to the Examples, which should not be construed as limiting the scope of the invention.

Production Example 1

Production of Polycarbonate-Polydimethylsiloxane Copolymer (PC-PDMS Copolymer (A-1))

(1) Synthesis of a Polycarbonate Oligomer

In a 5.6 mass % aqueous sodium hydroxide solution, sodium dithionite was added in an amount of 2,000 ppm by mass relative to bisphenol A that would be dissolved later. Then, bisphenol A was dissolved such that the concentration of the bisphenol A became 13.5 mass %, whereby an aqueous sodium hydroxide solution of the bisphenol A was prepared.

This aqueous sodium hydroxide solution of the bisphenol A, methylene chloride and phosgene were continuously passed through a tubular reactor (inner diameter: 6 mm, tube length: 30 m) at flow rates of 40 L/hr, 15 L/hr and 4.0 kg/hr, respectively. The tubular reactor had a jacket portion, and water was passed through the jacket, thereby to keep the temperature of the reaction liquid at 40° C. or less.

The reaction liquid that left the tubular reactor was continuously introduced into a chamber-type reactor (inner volume: 40 L) provided with a baffle. To this reactor, an aqueous sodium hydroxide solution of the bisphenol A, a 25 mass % sodium hydroxide solution, water and a 1 mass % aqueous triethylamine solution were added at flow rates of 2.8 L/hr, 0.07 L/hr, 17 L/hr and 0.64 L/hr, thereby to conduct a reaction. The reaction liquid overflown from the chamber-type reactor was continuously withdrawn and was allowed to stand. An aqueous phase was removed by separation, whereby a methylene chloride phase was collected.

The concentration of the thus obtained polycarbonate oligomer was 329 g/L and the concentration of the chloroformate group was 0.74 mol/L.

(2) Production of a polycarbonate-polydimethylsiloxane copolymer (Si-PC-1)

In a 50 L-chamber-type reactor provided with a baffle blade, a paddle-type stirring blade and a cooling jacket, 15 L of the polycarbonate oligomer solution produced above, 9.0 L of methylene chloride, 393 g of allylphenol terminal modified polydimethylsiloxane (PDMS) having a repeating number of the dimethylsiloxane unit of 90 and 8.8 mL of triethylamine were charged. With stirring, 1389 g of a 6.4 mass % aqueous sodium hydroxide solution was added, and the polycarbonate oligomer and the allylphenol terminal-modified PDMS were reacted for 10 minutes.

To this polymer liquid, a methylene chloride solution of p-t-butyl phenol (PTBP) (one obtained by dissolving 140 g of PTBP in 2.0 L of methylene chloride) and an aqueous sodium hydroxide solution of bisphenol A (BPA) (one obtained by dissolving 1012 g of BPA in an aqueous solution prepared by dissolving 577 g of NaOH and 2.0 g of sodium dithionite in 8.4 L of water) were added, and a polymerization reaction was conducted for 50 minutes.

For the purpose of dilution, 10 L of methylene chloride was added, and stirred for 10 minutes. Thereafter, the resultant was separated into an organic phase containing the polycarbonate-polydimethylsiloxane copolymer and an aqueous phase containing excessive amounts of BPA and NaOH, and the organic phase was isolated.

The thus obtained methylene chloride solution of the polycarbonate-polydimethylsiloxane copolymer was sequentially washed with 0.03 mol/L of an aqueous NaOH solution (15 vol % relative to the solution) and 0.2 mol/L of hydrochloric acid. Subsequently, washing was conducted with pure water until the electric conductivity of the aqueous phase after the washing became 0.01 µS/m or less.

The methylene chloride solution of the polycarbonate-polydimethylsiloxane copolymer obtained after the washing was concentrated and pulverized, and the resulting flakes were dried under reduced pressure at 120° C.

The amount of the PDMS residues (the amount of the PDMS copolymer) obtained by Nuclear Magnetic Resonance (NMR) was 6.0 mass %, the viscosity measured in accordance with ISO1628-4 (1999) was 46.9 and the viscosity-average molecular weight (Mv) was 17400.

Production Examples 2 to 6

Production of Polycarbonate-Polydimethylsiloxane Copolymers (Si-PC-2) to (Si-PC-6)

(Si-PC-2) to (Si-PC-6) were produced by changing the type of the polydimethylsiloxane (the average repeating number "n" of the siloxane group in the structural unit represented by the formula (II)), the amount of the polydimethylsiloxane and the amount of the p-t-butylphenol as shown in Table 1, whereby (Si-PC-2) to (Si-PC-6) were synthesized.

The composition, the viscosity and the viscosity-average molecular weight Mv of the resulting polycarbonate-polydimethylsiloxane copolymer are shown in Table 1.

TABLE 1

|  | Unit | Pro. Ex. 1 Si-PC-1 | Pro. Ex. 2 Si-PC-2 | Pro. Ex. 3 Si-PC-3 | Pro. Ex. 4 Si-PC-4 | Pro. Ex. 5 Si-PC-5 | Pro. Ex. 6 Si-PC-6 |
|---|---|---|---|---|---|---|---|
| Average repeating number n of siloxane group in the formula (II) | — | 90 | 90 | 150 | 300 | 40 | 90 |
| Amount of allyphenol terminal-modified polydimethylsiloxane | g | 393 | 315 | 197 | 183 | 393 | 393 |
| Amount of p-t-butylphenol | g | 140 | 127 | 127 | 127 | 113 | 97 |
| Amount of residues of allyphenol terminal-modified polydimethylsiloxane | Mass % | 6 | 4.8 | 2.8 | 2.6 | 6 | 6 |
| Viscosity | mL/g | 46.9 | 49.9 | 49.9 | 49.9 | 54.1 | 60 |
| Viscosity-average molecular weight Mv | — | 17400 | 18800 | 18800 | 18800 | 20600 | 23200 |

Examples 1 to 8 and Comparative Examples 1 to 4

The polycarbonate-polydimethylsiloxane copolymer (PC-PDMS copolymer) produced in Production Examples 1 to 6, Tarflon FN2500A (Product name, manufactured by Idemitsu Kosan Co., Ltd, BPA polycarbonate having p-t-butylphenol at the terminal thereof, viscosity 62.2, viscosity-average molecular weight Mv=24200), Tarflon FN2600A (Product name, manufactured by Idemitsu Kosan Co., Ltd, BPA polycarbonate having p-t-butylphenol at the terminal thereof, viscosity 64.9, viscosity-average molecular weight Mv=25400), Tarflon FN2700A (Product name, manufactured by Idemitsu Kosan Co., Ltd, BPA polycarbonate having p-t-butylphenol at the terminal thereof, viscosity 69.1, viscosity-average molecular weight Mv=27200), Novarex 7030PJ (Product name, manufactured by Mitsubishi Engineering-Plastics Corporation, BPA polycarbonate having p-t-butylphenol at the terminal thereof, viscosity 73.5, viscosity-average molecular weight Mv=29200), IRGAFOS168 (Product name, manufactured by Adeka Corporation, tris(2,4-di-tert-butylphenyl)phosphite), F-top KFBS (Product name, (manufactured by Japan Excel-Management Consulting Co., Ltd, potassium perfluorobutane sulfonate), Metablene A-3800 (Product name, manufactured by Mitsubishi Rayon Co., Ltd, powder mixture comprising polytetrafluoroethylene particles and organic polymer particles) were blended in amount ratios shown in Table 2. The resulting mixture was granulated by means of a twin extruder provided with a vent (Model "TEM-35B" manufactured by Toshiba Machine Co., Ltd.) at a resin temperature of 280° C., whereby pellets were obtained.

(Evaluation of Physical Properties)

By using granulated pellets obtained in the Examples and the Comparative Examples, the properties of the resin were evaluated by the following method. The results are shown in Table 2.

Viscosity-Average Molecular Weight (Mv)

The limiting viscosity [η] of methylene chloride at 20° C. was measured and then calculation was conducted in accordance with the Schnell's formula ([η]=1.23×10$^{-5}$×Mv 0.83).

Measurement of Fluidity (Q Value)

The resulting pellets were dried at 120° C. for 5 hours, and the Q value (flow value) was measured.

Q value (flow value) [Unit: 10$^{-2}$ mL/sec]

By using an elevated flow tester, the measurement was conducted in accordance with JISK 7210. At a temperature of 280° C. and under a pressure of 15.7 MPa, the amount of a molten resin (mL/sec) flown from a nozzle having a diameter of 1 mm and a length of 10 mm was measured.

The Q value means the amount of flown pellets per unit time, and a larger value means a larger fluidity.

Moldability

A box-shaped (thickness: 2 mm) molded product shown in FIG. 1 (40 mm×60 mm×15 mm) as a model of a current breaker case for automobiles was prepared by molding by means of an electric injection molding machine (EC100SX manufactured by Toshiba Machine Co., Ltd.) with a cylinder temperature of 320° C. and a mold temperature of 80° C., and moldability was evaluated in accordance with the following criteria:

○: Moldable
x: Not moldable

In Comparative Examples 3 and 4, an attempt was made to conduct injection molding. However, at a cylinder temperature of 320° C., the viscosity was too high, and a molded product could not be obtained due to insufficient filling.

Evaluation of Impact Strength

A box-shaped (thickness: 2 mm) molded product shown in FIG. 1 (40 mm×60 mm×15 mm) as a model of a current breaker case for automobiles was prepared by molding by means of an electric injection molding machine (EC100SX manufactured by Toshiba Machine Co., Ltd.) with a cylinder temperature of 320° C. and a mold temperature of 80° C. Two of this model products were fixed by means of a screw, and an impact strength test was conducted in accordance with ISO12097-3 (−35° C., 23° C., 85° C.). Impact strength was evaluated in accordance with the following criteria: ○: Good (no damage) x: Poor (damaged)

Evaluation of Flame Retardancy

A vertical flame test was conducted by using a test specimen (12.7 mm×127 mm×2.0 mm) prepared in accordance with the UL standard 94, and an evaluation was conducted in accordance with classifications of 5VB to V-2. Flame retardancy is superior in the order of 5VB>V-0>V-1 >V-2.

TABLE 2

| Composition | | | Unit | Ex. 1 | Ex. 2 | Ex. 3 | Ex. 4 | Ex. 5 | Ex. 6 |
|---|---|---|---|---|---|---|---|---|---|
| Polycarbonate-based resin | Polycarbonate-polyorgano-siloxane copolymer (A-1) | Si-PC-1 | mass % | — | 60 | — | — | — | 60 |
| | | Si-PC-2 | | 100 | — | — | — | — | — |
| | | Si-PC-3 | | — | — | 100 | — | — | — |
| | | Si-PC-4 | | — | — | — | 100 | — | — |
| | | Si-PC-5 | | — | — | — | — | 100 | — |
| | | Si-PC-6 | | — | — | — | — | — | — |

TABLE 2-continued

|  |  |  |  |  |  |  |  |  |
|---|---|---|---|---|---|---|---|---|
|  | Aromatic polycarbonate (A-2) | 7030PJ | mass % | — | — | — | — | — | — |
|  |  | FN2700A |  | — | — | — | — | — | — |
|  |  | FN2600A |  | — | 40 | — | — | — | 40 |
|  |  | FN2500A |  | — | — | — | — | — | — |
|  | Polyorgano-siloxane block | Content | mass % | 4.8 | 3.6 | 2.8 | 2.6 | 6 | 3.6 |
|  |  | Number of siloxane group | n | 90 | 90 | 150 | 300 | 40 | 90 |
| (A) | Total |  | Part by mass | 100 | 100 | 100 | 100 | 100 | 100 |
| (B) | Phosphorous-based antioxidant | IRGAFOS 168 | Part by mass | 0.1 | 0.1 | 0.1 | 0.1 | 0.1 | 0.1 |
| (C) | Metal salt*[1)] | KFBS |  | — | — | — | — | — | 0.03 |
| (D) | PTFE*[2)] | A-3800 |  | — | — | — | — | — | 0.3 |
| Physical properties of composition | Viscosity-average molecular weight | Mv |  | 18800 | 20600 | 18800 | 18800 | 20600 | 20600 |
|  | Fluidity | Q value | $10^{-2}$ mL/sec | 10 | 7 | 10 | 10 | 7 | 7 |
|  | Moldability |  |  | ○ | ○ | ○ | ○ | ○ | ○ |
|  | Impact resistance | 85° C. |  | ○ | ○ | ○ | ○ | ○ | ○ |
|  |  | 23° C. |  | ○ | ○ | ○ | ○ | ○ | ○ |
|  |  | −35° C. |  | ○ | ○ | ○ | ○ | ○ | ○ |
|  | Non-combusitibility (UL94) | 2mmt |  | V-2 | V-2 | V-2 | V-2 | V-2 | 5VB |

|  | Composition |  |  | Ex. 7 | Ex. 8 | Com. Ex. 1 | Com. Ex. 2 | Com. Ex. 3 | Com. Ex. 4 |
|---|---|---|---|---|---|---|---|---|---|
| Polycarbonate-based resin | Polycarbonate-polyorgano-siloxane copolymer (A-1) | Si-PC-1 |  | 50 | 50 | 100 | — | — | — |
|  |  | Si-PC-2 |  | — | — | — | — | — | — |
|  |  | Si-PC-3 |  | — | — | — | — | — | — |
|  |  | Si-PC-4 |  | — | — | — | — | — | — |
|  |  | Si-PC-5 |  | — | — | — | — | — | — |
|  |  | Si-PC-6 |  | — | — | — | — | 50 | — |
|  | Aromatic polycarbonate (A-2) | 7030PJ |  | 50 | 50 | — | — | 50 | — |
|  |  | FN2700A |  | — | — | — | — | — | — |
|  |  | FN2600A |  | — | — | — | — | — | 100 |
|  |  | FN2500A |  | — | — | — | 100 | — | — |
|  | Polyorgano-siloxane block | Content |  | 3 | 3 | 6 | 0 | 3 | 0 |
|  |  | Number of siloxane group |  | 90 | 90 | 90 | — | 90 | — |
| (A) |  |  | Total | 100 | 100 | 100 | 100 | 100 | 100 |
| (B) | Phosphorous-based antioxidant | IRGAFOS 168 |  | 0.1 | 0.1 | 0.1 | 0.1 | 0.1 | 0.1 |
| (C) | Metal salt*[1)] | KFBS |  | 0.1 | — | — | — | — | — |
| (D) | PTFE*[2)] | A-3800 |  | 0.6 | — | — | — | — | — |
| Physical properties of composition | Viscosity-average molecular weight | Mv |  | 23300 | 23300 | 17400 | 24200 | 26200 | 27200 |
|  | Fluidity | Q value |  | 4 | 4 | 15 | 3 | 2 | 2 |
|  | Moldability |  |  | ○ | ○ | ○ | ○ | x | x |
|  | Impact resistance | 85° C. |  | ○ | ○ | ○ | ○ | — | — |
|  |  | 23° C. |  | ○ | ○ | ○ | ○ | — | — |
|  |  | −35° C. |  | ○ | ○ | x | x | — | — |
|  | Non-combusitibility (UL94) | 2mmt |  | 5VB | V-2 | V-2 | V-2 | — | — |

*[1)]Metal salt: Alkali metal salts and/or alkaline earth metal salts of an organic sulfonic acid
*[2)]PTFE: Powder mixture comprising polytetrafluoroethylene particles and organic polymer particles From the results shown in Table 2, it can be understood that the cases obtained in Examples 1 to 8 had properties superior to those of the cases obtained in Comparative Examples 1 to 4. That is, it was revealed that the cases of Examples 1 to 8 were the cases having excellent impact strength at −35° C., 23° C. and 80 C. It was revealed that the cases of Examples 6 and 7 had excellent flame retardancy. On the other hand, the cases of Comparative Examples 1 and 2 were poor in impact strength at −35° C., and the cases of Comparative Examples 3 and 4 were poor in moldability since they were prepared by using a resin having a viscosity-average molecular weight of 25000 or more.

INDUSTRIAL APPLICABILITY

The current breaker case of the present invention can be effectively used as a constituent element of an apparatus that breaks current in an electric car (EV), a hybrid car (HV), a plug-in hybrid car (PHV) or the like in which a large current is flown frequently.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification of a Japanese application on the basis of which the present application claims Paris convention priority are incorporated herein by reference in its entirety.

The invention claimed is:

1. A current breaker case comprising a polycarbonate resin composition that comprises a polycarbonate-polyorganosiloxane copolymer and has a viscosity-average molecular weight of 18000 to 25000, wherein the polycarbonate resin composition comprises a polycarbonate-based resin (A) comprising:

5 to 100 mass % of a polycarbonate-polyorganosiloxane copolymer (A-1) that comprises, in its main chain, a polycarbonate block composed of structural units represented by the formula (I) and a polyorganosiloxane block composed of structural units represented by formula (II); the content of the polyorganosiloxane block being 2 to 20 mass %; and 0 to 95 mass % of an aromatic polycarbonate (A-2) that is other than the (A-1):

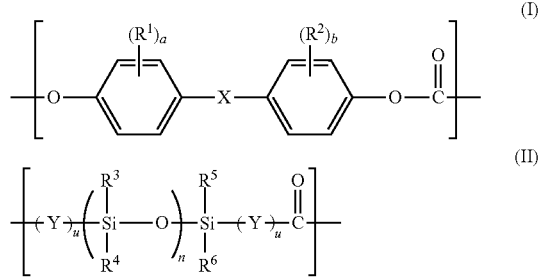

wherein $R^1$ and $R^2$ are each independently an alkyl group including 1 to 6 carbon atoms or an alkoxy group including 1 to 6 carbon atoms;

X is a single bond, an alkylene group including 1 to 8 carbon atoms, an alkylidene group including 2 to 8 carbon atoms, a cycloalkylene group including 5 to 15 carbon atoms, a cycloalkylidene group including 5 to 15 carbon atoms, —S—, —SO—, —SO$_2$—, —O— or —CO—;

a and b are an integer of 0 to 4;

$R^3$ to $R^6$ are each independently a hydrogen atom, a halogen atom or an alkyl group including 1 to 6 carbon atoms, an alkoxy group including 1 to 6 carbon atoms or an aryl group including 6 to 12 carbon atoms;

Y is a divalent organic group including one or more selected from an aliphatic chain and an aromatic ring;

u is 0 or 1; and n is an average repeating number of the siloxane group and is an integer of 20 to 600.

2. The current breaker case of claim 1, wherein Y is a divalent organic group derived from allylphenol or eugenol.

3. The current breaker case according of claim 1, wherein the structural unit represented by the formula (I) is a structural unit derived from bisphenol A.

4. The current breaker case of claim 1, wherein both $R^3$ and $R^4$ in the structural unit represented by the formula (II) are methyl groups.

5. The current breaker case of claim 1, wherein the polycarbonate resin composition further comprises one or more selected from the group consisting of component (B), component (C) and component (D) relative to 100 parts by mass of the polycarbonate-based resin (A):

(B) 0.01 to 1 part by mass of a phosphorous-based antioxidant;

(C) 0.01 to 0.15 part by mass of one or more selected from an alkali metal salt of an organic sulfonic acid and an alkaline earth metal salt of an organic sulfonic acid; and (D) 0.1 to 1 part by mass of powder mixture comprising polytetrafluoroethylene particles and organic polymer particles.

6. The current breaker case of claim 5, wherein the polycarbonate resin composition further comprises component (B).

7. The current breaker case of claim 5, wherein the polycarbonate resin composition further comprises component (C).

8. The current breaker case of claim 5, wherein the polycarbonate resin composition further comprises component (D).

9. A current breaker comprising the current breaker case of claim 1 and an electronic circuit.

10. The current breaker case of claim 1, wherein the viscosity-average molecular weight is within a range of 18600 to 24400.

11. The current breaker case of claim 1, wherein n is an integer of 20 to 300.

12. The current breaker case of claim 1, wherein n is an integer of 20 to 150.

13. The current breaker case of claim 1, wherein the viscosity-average molecular weight is 18800 to 25000.

14. The current breaker case of claim 1, wherein the viscosity-average molecular weight is 18000 to 23300.

15. The current breaker case of claim 1, wherein polycarbonate-based resin (A) comprises:

30 to 100 mass % of a polycarbonate-polyorganosiloxane copolymer (A-1); and 0 to 70 mass % of aromatic polycarbonate (A-2).

16. The current breaker case of claim 1, wherein polycarbonate-based resin (A) comprises:

45 to 100 mass % of a polycarbonate-polyorganosiloxane copolymer (A-1); and 0 to 55 mass % of aromatic polycarbonate (A-2).

17. The current breaker case of claim 1, wherein polycarbonate-based resin (A) comprises:

60 to 100 mass % of a polycarbonate-polyorganosiloxane copolymer (A-1); and 0 to 40 mass % of aromatic polycarbonate (A-2).

18. The current breaker case of claim 1, wherein polycarbonate-based resin (A) comprises 100 mass % of a polycarbonate-polyorganosiloxane copolymer (A-1) and 0 mass % of aromatic polycarbonate (A-2).

* * * * *